Nov. 22, 1932.          O. MITCHELL          1,888,237
MECHANICAL COTTON DISTRIBUTOR
Filed Dec. 5, 1930          2 Sheets-Sheet 1
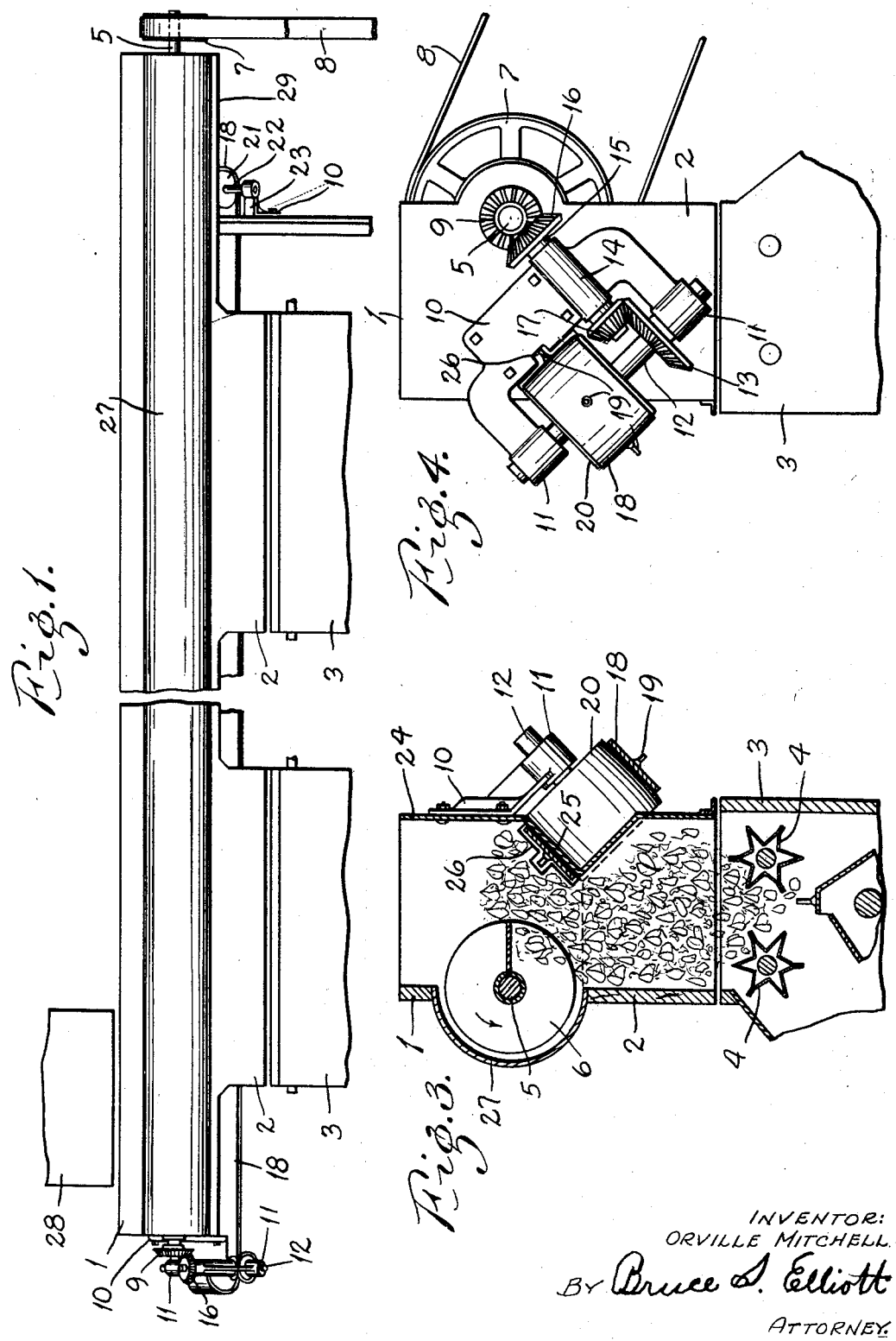
INVENTOR:
ORVILLE MITCHELL.
By Bruce S. Elliott
ATTORNEY.

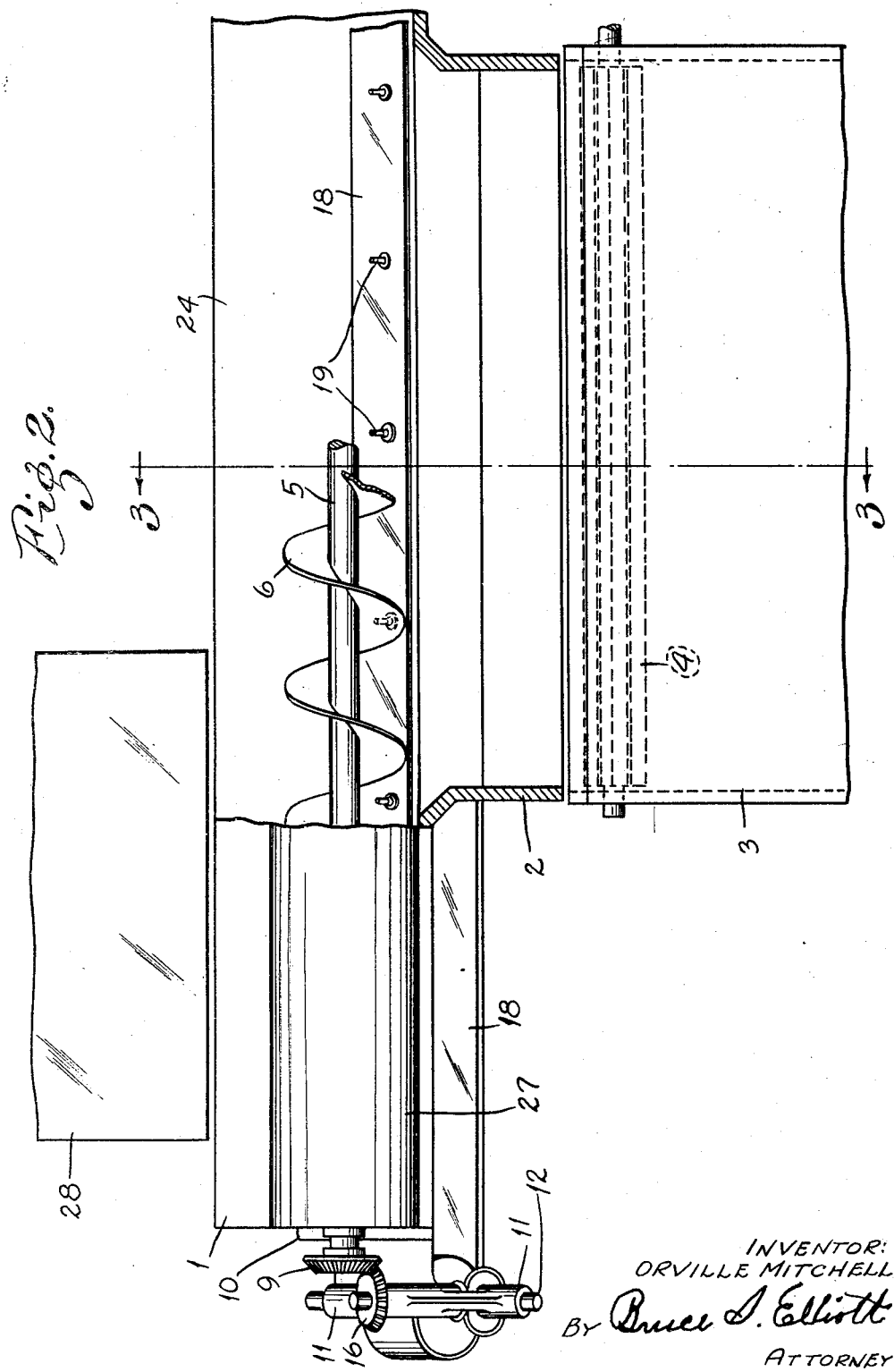

Patented Nov. 22, 1932

1,888,237

UNITED STATES PATENT OFFICE

ORVILLE MITCHELL, OF DALLAS, TEXAS

MECHANICAL COTTON DISTRIBUTOR

Application filed December 5, 1930. Serial No. 500,238.

The general object of this invention is to provide a mechanical cotton distributor which shall operate to convey the cotton over and feed it uniformly into a series of hoppers communicating with a line of gins, or cotton cleaning machines, with the minimum of agitation or machining action on the cotton, and with the avoidance of certain objections incident to the use of mechanical cotton distributors of the types now generally employed, and particularly to that type of distributor having a drag belt.

In this latter type of distributor, a spiked belt is arranged to travel over the mouths of the hoppers, with the spikes on the working side projecting downwardly, and as each hopper is filled the cotton fed into the distributor is dragged by the spikes over the cotton in the filled hoppers until it arrives at an empty or partially filled hopper, into which it falls. This not only produces an uneven packing of the cotton in the hoppers, but in being dragged over the cotton in the filled hoppers, the cotton being carried forward is subjected to an intense pulling and stretching action, due to the frictional resistance offered to its movement, which results in producing a machining, roping and twisting action on the cotton, thereby damaging it and lowering its quality.

In an application for patent owned by the same interests as own the present application, a mechanical cotton distributor comprising two endless screw conveyors, is disclosed, and the design of this conveyor is to overcome the disadvantages of both the drag belt type of distributor and the single screw conveyor type.

It is recognized that a drag belt is positive in its feeding action and its operation is not seriously impaired by extreme variations in the quality or weight of the cotton being distributed.

The present invention, therefore, is in the nature of an improvement over the cotton distributor described in the application referred to above, in that I utilize the conveying and lifting functions of a screw conveyor simultaneously, and in cooperation with, a spiked belt, which latter, however, functions solely as a carrier for the cotton, and the spiked belt being so positioned that practically no dragging action occurs as the cotton is being moved over the hoppers.

My invention is characterized by a housing of any desired length, having a series of hoppers depending therefrom, a screw conveyor arranged at one side of the housing, and a spiked belt mounted in the opposite side of the housing with its working side, that is, the side traveling through the housing, inclined at an angle to the bottom of the housing, so that the spikes thereof face the screw conveyor, the conveyor and belt being adapted to have the same rate of forward progression.

The purpose and advantages of this arrangement will be more fully set forth in the course of the following detailed description of the invention.

In the accompanying drawings:

Fig. 1 is a view in side elevation, showing my improved distributor having the hoppers of the housing arranged above a line of cotton cleaning or ginning machines, two of such machines being shown;

Fig. 2 is a view on an enlarged scale of the left hand end of the machine shown in Fig. 1, a part of the casing of the housing being broken away to better illustrate the construction;

Fig. 3 is a cross-sectional view, taken on the line 3—3 of Fig. 2 and viewed in the direction of the arrows; and Fig. 4 is an end view looking from the left of Fig. 1.

Referring now to the drawings, the numeral 1 indicates the housing of the distributor, from the lower side of which depend a series of hoppers 2, each of which is designed to be located above a gin or cotton cleaning machine 3, the latter being provided with feed-rollers 4 for feeding the cotton dropping from the hoppers 2 to the cleaning or ginning devices of the machine. The numeral 5 indicates the shaft of a screw conveyor 6, which extends throughout the housing 1, the shaft 5 being mounted in suitable bearings in the ends of the housing and one end of said shaft, as shown at the right of Fig. 1, being provided with a pulley 7 driven from a belt 8 from a suitable source of power (not shown). The other end of shaft 5 is provided with a bevel gear 9. Mounted on the end of housing 1, as shown in Figs. 1 and 4, is a bracket 10 of substantially U-shape construction, providing bearings 11 for a shaft 12 on which is mounted a bevel gear 13. The bracket 10 also provides a bearing 14 for a shaft 15, on the upper end of which is mounted a bevel gear 16, in mesh with the bevel gear 9, and on the lower end of which is mounted a bevel pinion 17 in mesh with the bevel gear 13. The numeral 18 indicates a belt carrier having spikes 19 secured thereon at intervals throughout its length, said belt carrier being mounted at one end on a pulley 20 secured on shaft 12, Fig. 4, and at its other on an idler pulley 21 (see the right hand side of Fig. 1) secured on a shaft 22 mounted in suitable bearings on a bracket 23 secured on the end frame of the distributor.

Thus the conveyor 6 is rotated in the direction shown by the arrow in Fig. 3, through the medium of belt 8 and pulley 7, mounted on one end of shaft 5, and the drag belt 18 is driven through the medium of the bevel gear 9, mounted on the other end of shaft 5, bevel gear 16 in mesh therewith, shaft 15, bevel gears 17 and 13, shaft 12 and pulley 20.

From an inspection of Figs. 3 and 4, it will be seen that the shaft 12 is inclined at an angle of about forty-five degrees to the vertical wall 24 of the casing, and it will be understood that the shaft 22 at the other end of the distributor is correspondingly inclined. As a result, the sides of the drag belt 18 mounted on the pulleys 20 and 21 on said shafts will be correspondingly inclined so that the working side of drag belt 18 within the housing 1, as shown by Fig. 3, will travel in a plane correspondingly inclined. It follows, therefore, that the spikes on the working side of the drag belt will be directed toward the conveyor 6. The wall of casing 1, on the side containing the drag belt, is bent inward at an angle of forty-five degrees, as indicated at 25 in Fig. 3, to form a bottom or race for the underside of belt 18, and the end wall of casing 1 is cut away, as indicated at 26, to permit the passage of the belt therethrough.

As shown by Fig. 3, the shaft 5 of the conveyor is mounted substantially in the vertical plane of one of the side walls of the housing 1, so that approximately only one-half of the conveyor works within the housing. The other half of the conveyor is inclosed in a semi-circular casing section 27.

Seed cotton is conveyed to a hopper 28, from a wagon, or other source of supply, by conventional means, including an exhauster or dropper, not illustrated, and from the hopper 28 it drops into housing 1. As shown at the left of Figs. 1 and 2, the hopper 28 is located to one side of the first feed hopper 2, and the conveyor 6 and drag belt 18 also extend beyond the first feed hopper and under the opening of the hopper 28. Seed cotton fed to housing 1 through hopper 28 will, therefore, fall upon the distributors 6 and 18 at a point beyond the first hopper 2, so that it can only fall into said hopper as it is moved over the same by the action of the distributors.

At the opposite end of the distributor to that just referred to, the conveyor 6 extends beyond the drag belt 18 on pulley 21, so as to provide a quite large opening to permit of the discharge of excessively heavy wads of cotton which might get into the distributor at times, due to abnormal operating conditions.

In operation, cotton fed into housing 1 will fall upon the drag belt 18 and be carried over the hoppers 2 in order, from the front end to the rear end of the housing, by the cooperative action of drag belt 18 and conveyor 6. While the weight of the cotton being carried forward is to a considerable extent borne by the belt 18, this belt, as stated, is provided with the spikes 19 to insure a positive engagement with the cotton. These spikes, while long enough for the purpose stated, are yet short enough to permit the cotton to readily fall off of the belt when it reaches an unfilled hopper or the overflow point, indicated at 29, at the right of Fig. 1. It will be apparent that as the belt carrier 18 and the ribbon or blade of the screw conveyor have a forward progression at the same rate of speed, the cotton is moved forward in a body to the first hopper until it is filled. In other words, on reaching an empty hopper, the cotton slides off of the belt 18 through the opening between the lower edge of the belt and the wall of the housing beneath the screw conveyor. It will also be seen, that as soon as the hopper is filled, the lower or inside portion of the conveyor exerts a lifting action on the cotton, which rolls the cotton over on to the belt carrier 18, while at the same time the conveyor blade or ribbon also has a carrying action uniform in speed with the travel of the belt, so that the cotton is carried forward to the next hopper; and any cotton fed into the distributor in excess of the rate at which it is being withdrawn from the hoppers, is carried to the end of the housing 1 and discharged at the overflow point or opening 29.

From the foregoing description of the operation, it will be apparent, that my distributor overcomes the objections to the drag belt type of distributor, in that the belt 18 acts as a carrying belt, and in conjunction with the conveyor, the action on the cotton is that of a forward movement, effected largely by the carrying belt, and a forward and simultaneous lifting movement, effected by the conveyor.

The conveyor 6 can be of comparatively small size in diameter, and since, as stated, the carrying forward of the cotton is accomplished chiefly by the belt 18, there is very little tendency for the cotton to be carried over and around the conveyor. For the reasons stated, therefore, my distributor is not only very effective in operation, but it distributes the cotton uniformly and with the least amount of agitation or machining action. This latter result is due to the fact, as will now be apparent, that I practically avoid all dragging of the cotton, in its passage through the housing, over and in contact with the cotton in filled hoppers.

I claim:—

1. In a cotton distributor, in combination with a housing having a plurality of depending hoppers and with means for feeding cotton into one end of said housing, means for distributing cotton to said hoppers comprising a screw conveyor mounted in said housing to extend over said hoppers, and an endless carrier having a working side traveling in spaced parallel relation to, and cooperating with said conveyor.

2. In a cotton distributor, in combination with a housing having a plurality of depending hoppers and with means for feeding cotton into one end of said housing, means for distributing cotton to said hoppers comprising a screw conveyor mounted in said housing to extend over said hoppers, and an endless carrier inclined at an angle to the horizontal and having a working side traveling in spaced relation to, and cooperating with said conveyor.

3. In a cotton distributor, in combination with a housing having a plurality of depending hoppers and with means for feeding cotton into one end of said housing, means for distributing cotton to said hoppers comprising a screw conveyor mounted in said housing to extend over said hoppers, and an endless spiked belt carrier inclined at an angle to the horizontal and having a working side traveling in spaced parallel relation to, and cooperating with said conveyor.

4. In a cotton distributor, in combination with a housing having a plurality of depending hoppers and with means for feeding cotton into one end of said housing, means for distributing cotton to said hoppers comprising a screw conveyor mounted in said housing to extend over said hoppers, and an endless spiked belt carrier upwardly and outwardly inclined with respect to the bottom of the housing and having a working side traveling in spaced parallel relation to and cooperating with said conveyor.

5. In a cotton distributor, in combination with a housing having vertical side walls and a plurality of depending hoppers and with means for feeding cotton into one end of said housing, means for distributing cotton to said hoppers comprising a screw conveyor mounted in said housing to extend over said hoppers in a manner to have substantially only one-half of the conveyor rotate within the space confined by the vertical walls of the housing, and an endless belt carrier inclined at an angle to the horizontal and having a working side traveling in spaced relation to and cooperating with said conveyor.

6. In a cotton distributor, in combination with a housing having vertical side walls and a plurality of depending hoppers and with means for feeding cotton into one end of said housing, means for distributing cotton to said hoppers comprising a screw conveyor mounted in said housing to extend from end to end thereof over said hoppers and in such manner that substantially only one-half of the conveyor rotates within the space confined by the vertical walls of the housing, and an endless spiked belt carrier inclined at an angle to the horizontal and having a working side traveling in spaced parallel relation to and cooperating with said conveyor, said carrier having its delivery end terminating short of the delivery end of said screw conveyor.

In testimony whereof, I, have hereunto set my hand.

ORVILLE MITCHELL.